United States Patent [19]

Itoh

[11] Patent Number: 4,905,027
[45] Date of Patent: Feb. 27, 1990

[54] CONTROL METHOD AND APPARATUS FOR OPTICAL PRINTER HEAD

[75] Inventor: Tetsuya Itoh, Osaka, Japan

[73] Assignee: Minolta Camera Co., Ltd., Osaka, Japan

[21] Appl. No.: 372,891

[22] Filed: Jun. 28, 1989

[30] Foreign Application Priority Data

Jun. 29, 1988 [JP] Japan ................. 63-161268

[51] Int. Cl.⁴ ............................................. G01D 15/00
[52] U.S. Cl. ..................................... 346/160; 346/154
[58] Field of Search ................. 346/160, 154, 107 R, 346/108, 76 L; 358/300, 302

[56] References Cited

U.S. PATENT DOCUMENTS 4,769,659  9/1988  Umeda et al. ................. 346/160
4,803,565  2/1989  Teshigawara et al. ......... 346/160

Primary Examiner—Arthur G. Evans
Attorney, Agent, or Firm—Willian Brinks Olds Hofer Gilson & Lione

[57] ABSTRACT

A method and apparatus for controlling an optical printer where respective light emitting elements are energized for light emission based on one line amount of received image data for a time equal to an ON time of a strobe signal thereby to form an image on a photosensitive member. The strobe signal is selected from a group consisting of a predetermined number of base signals each having a different ON time and one or a plurality of composite signals each composed of a different combination of the base signals. The one line amount of image data are outputted for a number of times equal to the number of base signals, within a time allotted for one line amount of exposure. The light emitting elements corresponding to the image data are energized for light emission for a time equal to the ON time of the selected strobe signal.

4 Claims, 4 Drawing Sheets

CONTROL METHOD AND APPARATUS FOR OPTICAL PRINTER HEAD

BACKGROUND OF THE INVENTION

1. Field of the Invention

The present invention relates to a method and apparatus for controlling a printer head of e.g. an LED printer, and more particularly to a method and apparatus of the above type for use in halftone printing.

2. Description of Related Arts

In conventional optical printers such as an LED printer, such systems as the dither system and the density pattern system have been used for expression of gradation.

With these systems; however, while some improvement is possible in the gradation expression performance of the printer by increasing the matrix size, the increased matrix size inevitably invites substantial deterioration in image resolution.

In view of the above problem, the prior art has suggested gradation expression through multi-level dot control scheme.

For instance, a Japanese patent laid open under 59-127468 discloses such multi-level dot control scheme in which supply current values to respective LED elements are varied separately in correspondence with a plurality of predetermined dot gradation levels thereby to independently control the output light amounts of the respective LED elements within one scanning period.

A further Japanese patent laid open under 60-005387 (corresponding to U.S. Pat. No. 4,596,995) discloses an alternate multi-level dot control scheme in which driving times of the respective LED elements are separately varied in correspondence with a plurality of predetermined gradation levels thereby to independently control the per-scanning-period output light amounts of the respective LED elements.

In either of the above-described prior systems, the LED element is energized for light emission one time in one scanning period. Accordingly, in order to provide each LED element with a different current or a different driving time, a complicated circuit is needed for the discrete control of the currents and driving times for the elements. That is to say, with the above-described methods, it is impossible to utilize the conventional printer head or drive circuitry based on the binary-level control scheme.

SUMMARY OF THE INVENTION

In a method of controlling an optical printer having a movable photosensitive member and a plurality of dot type light emitting elements linearly aligned normal to the moving direction of the photosensitive member, with the respective light emitting elements being energized for light emission based on one line amount of received image data, a primary object of the present invention is to provide an improved method which enables the conventional binary-level controlled printer head or drive circuitry to readily function under a multi-level dot control system.

In order to accomplish the above object, an optical printer controlling method of the invention comprises the steps of:

(1) selecting one from a plurality of strobe signals each having a different ON time, the strobe signals including a predetermined number of base signals each having a different ON time and a plurality of composite signals each composed of a different combination of the base signals;

(2) outputting one line amount of image data by a number of times equal to the number of the base strobe signals within a time allotted for one line amount of image exposure; and (3) energizing the light emitting elements for light emission for a time corresponding to the ON time of the selected strobe signal.

Further, in order to accomplish the above object, in a control apparatus having a movable photosensitive member and a plurality of dot type emitting elements linearly aligned normal to the moving direction of the photosensitive member, the control apparatus energizing the light emitting elements for light emission based on one line amount of received image data, the control apparatus of the invention comprises: a shift register for receiving image data; a latch register for receiving the image data from the shift register; strobe signal output means for selecting one from a plurality of strobe signals each having a different ON time in accordance with image density information, the strobe signals including a predetermined number of base signals each having a different ON time and a plurality of composite signals each composed of a different combination of the base signals, said latch register receiving one line amount of image data by a number of times equal to said predetermined number of base signals, and logic means for controlling power supply to the light emitting elements, the logic means receiving signals from said latch register and said strobe signal output means and energizing the light emitting elements corresponding to the image data for light emission for a time corresponding to the ON time of the selected strobe signal.

That is to say, according to the present invention, the time period allotted for one line amount of image exposure is divided into the different sub-periods in each of which the respective light emitting elements are turned ON/OFF, whereby multi-level dot control is achieved through the varied combinations of ON times of the LED elements.

Consequently, the number of dot control levels may be increased while reducing the frequency of data output operation.

The foregoing and other objects, features and advantages of the invention will be apparent from the following more particular description of one preferred embodiment of the invention, as illustrated in the accompanying drawings.

DESCRIPTION OF THE PREFERRED EMBODIMENT

One preferred embodiment of the present invention will be detailed hereinafter with reference to the accompanying drawings.

Figure 1:
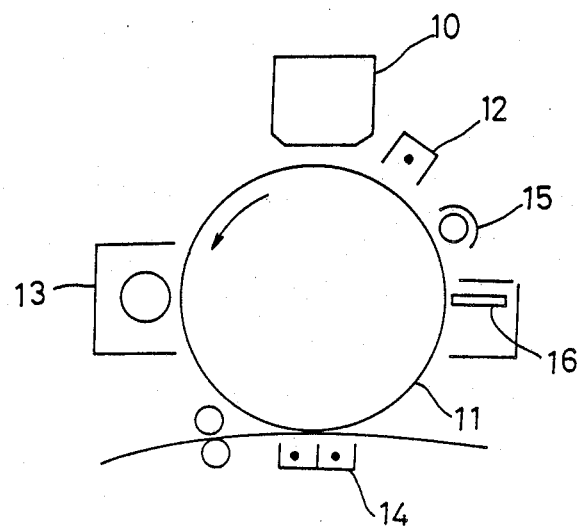
FIG. 1 is a schematic the periphery of an LED printer head and a photosensitive member of an optical printer.

FIG. 1 schematically shows a construction of an optical printer having an LED printer head 10. This printer head 10 is opposed to a surface of a drum type photosensitive member 11. In operation, as the light emitted from the LED reaches the drum surface uniformly charged by a corona charger 12, an electrostatic latent image is formed on the photosensitive member surface. Thereafter, by a developing device 13, a toner image corresponding to the electrostatic latent image is formed on the drum surface, which toner image is then transferred onto a recording sheet by means of a transfer charger 14. After this image transfer, any toner material remaining on the surface of photosensitive member 11 is removed by a cleaner 16. Then, the residual charge on the drum surface is erased by an eraser 15.

Figure 2:
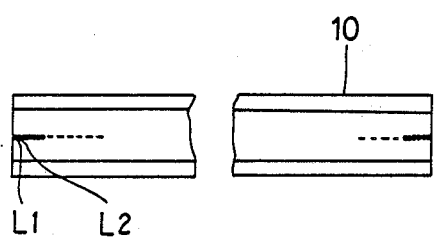
FIG. 2 is a front view of the LED printer head.

FIG. 2 is a schematic front view of an LED printer head 10 showing an LED array 1 including a plurality of dot type LED elements L1, L2 ... Ln. These LED elements L1, L2 ... Ln of the LED array 1 are aligned in a direction normal to a moving direction (denoted by an arrow) in FIG. 1 of the photosensitive member 11.

Figure 3:
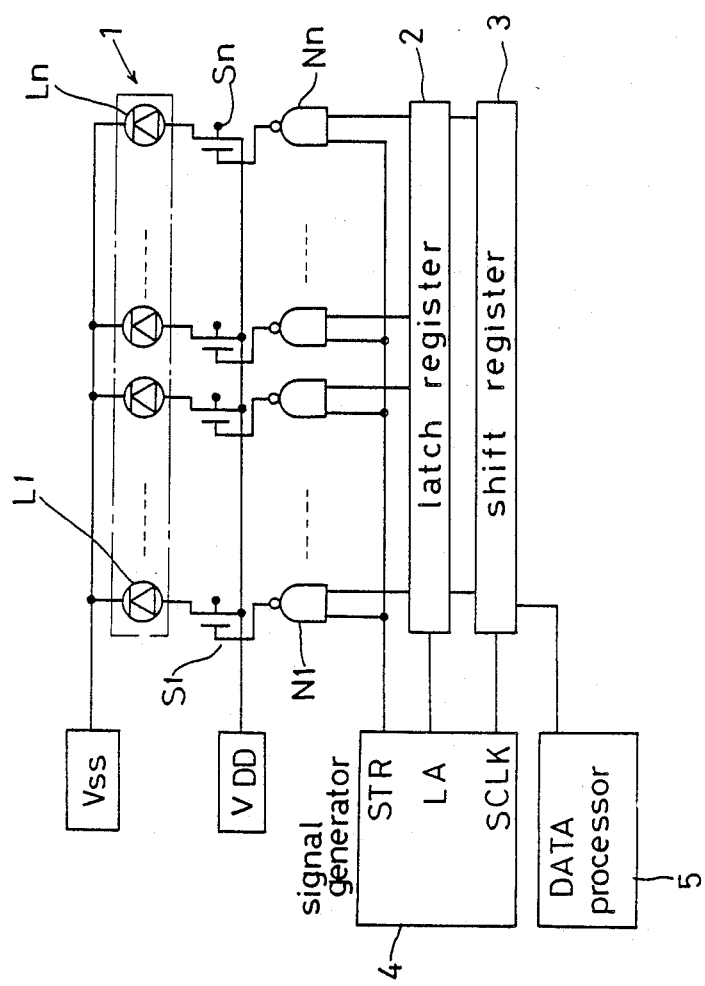
FIG. 3 is a block diagram of an electric circuitry employed in the LED printer head.

FIG. 3 is a block diagram illustrating an electric construction of the LED printer head 10. This LED printer head 10 includes, in addition to the LED elements L1, L2 ... Ln, switching elements S1 through Sn for respectively switching the corresponding LED elements, logic gates N1 through Nn for outputting data (data for driving the LED elements) at a timing dictated by a strobe signal STR, a latch register 2 and a shift register 3. The logic gates N1 through Nn, with an ON state of the strobe signal STR, output ON or OFF print data for turning ON or OFF the corresponding LED elements.

The print data transferred from an unillustrated host computer to a data processor 5 are serially loaded line-by-line at the shift register 3 synchronously with a shift clock signal SCLK generated by a signal generator 4. Then, the data loaded at the shift register 3 are moved to the latch register 2 to be latched thereat at a timing dictated by a latch pulse LA.

Thereafter, the latched data are outputted in parallel from the logic gates N1 through Nn in synchronism with the strobe signal STR thereby to turn ON or OFF the corresponding LED elements.

Figure 4:
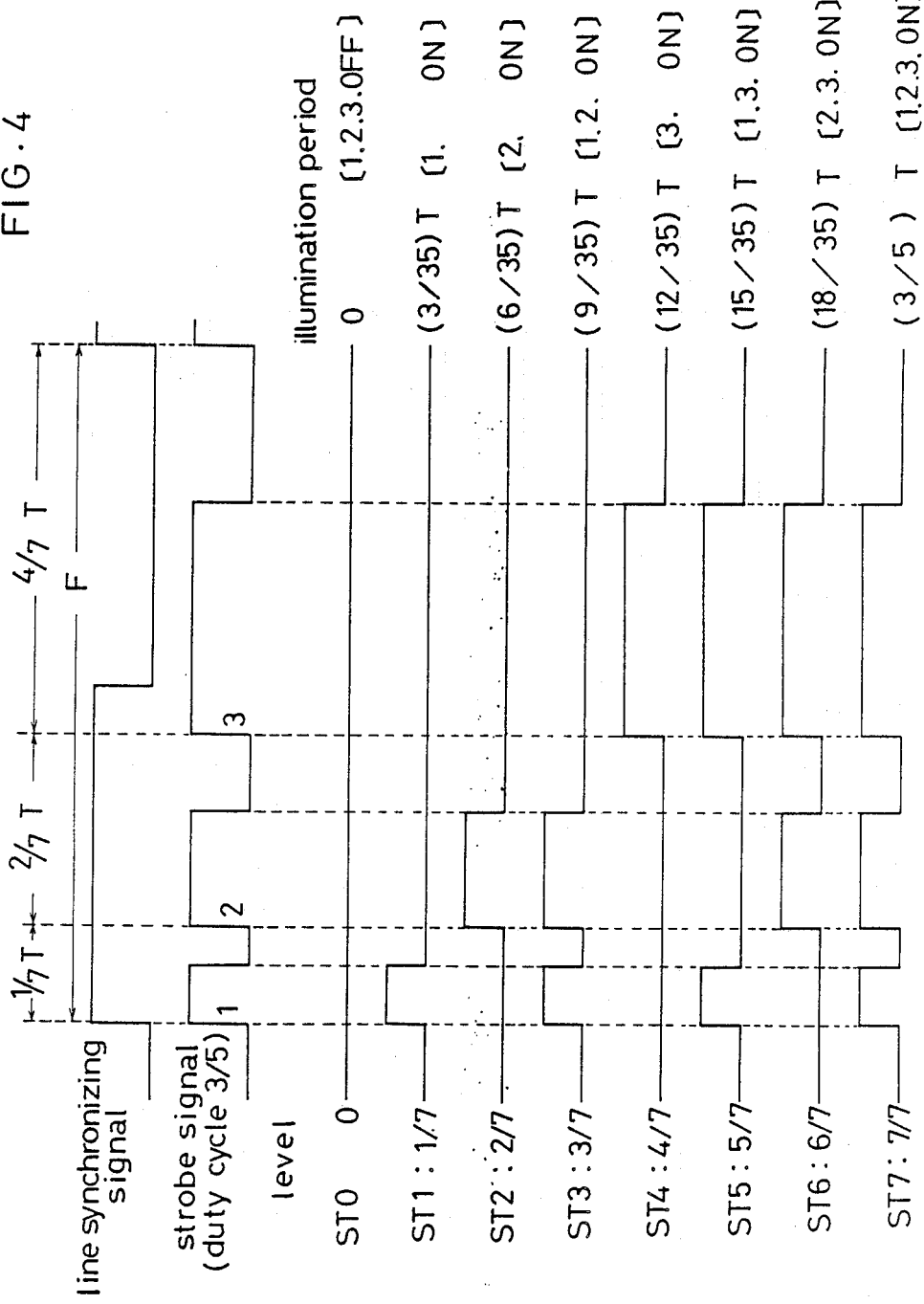
FIG. 4 is a view illustrating varied illumination periods of the LEDs in relation with a line synchronizing signal.

In this particular embodiment, as shown in FIG. 4, there are provided eight kinds of strobe signals ST0 through ST7. These strobe signals include three kinds of base signals and four kinds of composite signals each composed of a different combination of the three kinds of base signals. Specifically, the base strobe signals ST1, ST2 and ST4 respectively have pulse periods of $(1/7) \cdot T$, $(2/7) \cdot T$ and $(4/7) \cdot T$, where T denotes a period of one scanning cycle. The composite strobe signals ST3, ST5, ST6 and ST7 respectively have pulse periods defined by the following equations:

$$ST3 = ST1 + ST2$$

$$ST5 = ST1 + ST4$$

$$ST6 = ST2 + ST4$$

$$ST7 = ST1 + ST2 + ST4$$

Then, if a duty cycle is d, the ON times (i.e. pulse widths) within one scanning period of the respective strobe signals are expressed by the following equations:

$$ST0 = 0$$

$$ST1 = (1/7) \cdot T \cdot d$$

$$ST2 = (2/7) \cdot T \cdot d$$

$$ST3 = (1/7) \cdot T \cdot d + (2/7) \cdot T \cdot d = (3/7) \cdot T \cdot d$$

$$ST4 = (7/7) \cdot T \cdot d$$

$$ST5 = (1/7) \cdot T \cdot d + (4/7) \cdot T \cdot d = (5/7) \cdot T \cdot d$$

$$ST6 = (2/7) \cdot T \cdot d + (4/7) \cdot T \cdot d = (6/7) \cdot T \cdot d$$

$$ST7 = (1/7) \cdot T \cdot d + (2/7) \cdot T \cdot d + (4/7) \cdot T \cdot d = (7/7) \cdot T \cdot d$$

Then, if the duty cycle is set at 3/5 for example, the illumination (ON) periods within one scanning period of the LEDs corresponding the respective strobe signals ST0 through ST7 are:

| strobe signal | illumination period |
| --- | --- |
| ST0 | 0 |
| ST1 | $(3/35) \cdot T$ |
| ST2 | $(6/35) \cdot T$ |
| ST3 | $(9/35) \cdot T$ |
| ST4 | $(12/35) \cdot T$ |
| ST5 | $(15/35) \cdot T$ |
| ST6 | $(18/35) \cdot T$ |
| ST7 | $(21/35) \cdot T$ |

As described above, the system of this embodiment can provide the LED illumination periods in 8 different levels.

Also, the period T of the line synchronizing signal is expressed by the following equation:

$$T = 1/f = Vp \cdot Pi$$

where,

Vp: processing speed (rotational speed of the photosensitive member),

Pi: printing density

Then, the data transfer is possible with a range defined by:

$$(m-1) f \cdot n < f_{SCLK} < (f_{SCLK})_{MAX}$$

where, m: the number of levels of multi-level dot control, n: the total number of dots of head, $f_{SCLK}$: frequency of shift clock signal $(f_{SCLK})_{MAX}$: maximum response frequency of the head.

Also, when the data are transferred in divided groups, the above expression is modified as:

$$f_{SCLK}/k$$

where, k: the number of division

Further, when the print data fall short of the LED capacity, the area management should be effected through a program so as to transfer OFF data to the excess LED elements exceeding the defined area.

Figure 5:
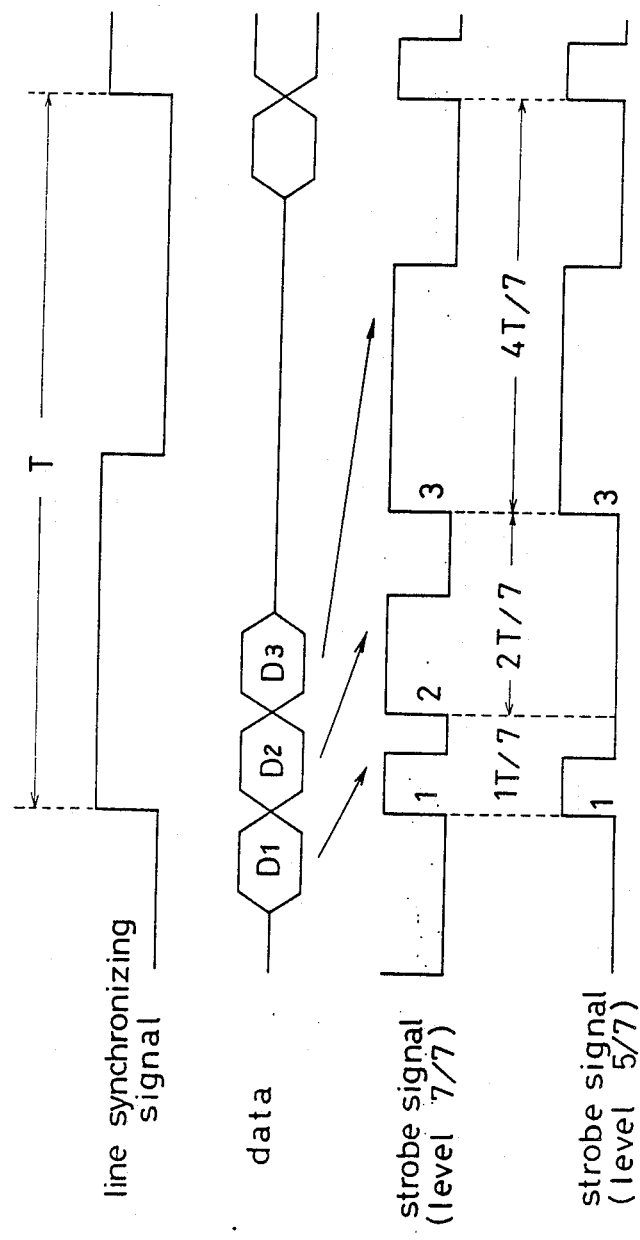
FIG. 5 is a timing chart illustrating operational timings of the circuitry.

FIG. 5 illustrates the relationship between the transferred data and the strobe signals. In this embodiment, the same one scanning amount of data are transferred for three times i.e. as D1, D2 and D3 within one scanning period T. In the level 7/7 for example, within the one scanning period T, the LED elements are energized for light emission for a period: $(1/7) \cdot T \cdot d$ based on the data D1, for a period: $(2/7) \cdot T \cdot d$ based on the data D2 and for a period: $(4/7) \cdot T \cdot d$ based on the data D3. Thus, the LED elements are energized within the one scanning period T for the total time defined by the following equation:

$$(1/7) \cdot T \cdot d + (2/7) \cdot T \cdot d + (4/7) \cdot T \cdot d = (7/7) \cdot T \cdot d$$

Similarly, in the level 5/7, within one scanning period T, the LED elements are energized for light emission for a period: $(1/7) \cdot T \cdot d$ and for a period $(4/7) \cdot T \cdot d$ based on the data D3. Thus, the LED elements are energized within the one scanning period T for the total time defined by the following equation:

$$(1/7) \cdot T \cdot d + (4/7) \cdot T \cdot d = (5/7) \cdot T \cdot d$$

As described above, through the control of illumination energy applied to the photosensitive member within one scanning period, the degree of multi-level representation of gradation is possible while reducing the frequency of data output operations.

Incidentally, although the above-described embodiment relates solely to the LED printer head, the invention may be embodied without deviating from its scope in a liquid crystal shutter, a LPZT shutter and so on.

What is claimed is:

1. In a method of controlling an optical printer having a movable photosensitive member and a plurality of dot type light emitting elements linearly aligned normal to the moving direction of the photosensitive member, with the respective light emitting element being energized for light emission based on one line amount of received image data, the method comprising the steps of:
   (1) selecting one from a plurality of strobe signals each having a different ON time, the strobe signals including a predetermined number of base signals each having a different ON time and a plurality of composite signals each composed of a different combination of the base signals;
   (2) outputting one line amount of image data by a number of times equal to the number of the base strobe signals within a time allotted for one line amount of image exposure; and
   (3) energizing the light emitting elements corresponding to the image data for light emission for a time corresponding to the ON time of the selected strobe signal.

2. A method of claim 1, wherein the sum of the periods of said respect base signals equate with said time allotted for one line amount of exposure.

3. A method of claim 2, wherein said strobe signals include first through third base signals and first through fourth composite signals and if said time allotted for one line amount of exposure is T; then, said first base signal has a period: $(1/7) \cdot T$, said second base signal has a period: $(2/7) \cdot T$, said third base signal has a period: $(4/7) \cdot T$, said first composite signal being composed of said first and second base signals, said second composite signal being composed of said first and third composite signals, said third composite signal being composed of said second and third base signals and said fourth composite signal being composed of said first, second and third base signals.

4. A control apparatus for controlling an optical printer having a movable photosensitive member and a plurality of dot type light emitting elements linearly aligned normal to the moving direction of the photosensitive member, the control apparatus energizing each said light emitting element for light emission based on one line amount of received image data, said control apparatus comprising:
   a shift register for receiving image data;
   a latch register for receiving the image data from said shift register;
   strobe signal output means for selecting one from a plurality of strobe signals each having a different ON time in accordance with image density information, said strobe signals including a predetermined number of base signals each having a different ON time and a plurality of composite signals each composed of a different combination of the base signals,
   said latch register receiving one line amount of image data by a number of times equal to said predetermined number of base signals, and
   logic means for controlling power supply to the light emitting elements, said logic means receiving signals from said latch register and said strobe signal output means and energizing the light emitting elements corresponding to the image data for light emission for a time corresponding to the ON time of the selected strobe signal.

* * * * *

UNITED STATES PATENT AND TRADEMARK OFFICE
CERTIFICATE OF CORRECTION

PATENT NO. : 4,905,027

DATED : February 27, 1990

INVENTOR(S) : Tetsuya Itoh

It is certified that error appears in the above-identified patent and that said Letters Patent is hereby corrected as shown below:

In col. 2, line 57, after "schematic", insert --showing--.

In col. 3, line 27, change "arrow) in FIG. 1" to --arrow in FIG. 1)--.

In col. 4, line 12, change "ST3 = (1/7)·Td + (2/7)·T·d = (3/7)·T·d" to --ST3 = (1/7)·T·d + (2/7)·T·d = (3/7)·T·d--.

In col. 4, line 14, change "ST4 = (7/7)·T·d" to --ST4 = (4/7)·T·d--.

Signed and Sealed this

Twenty-seventh Day of August, 1991

Attest:

HARRY F. MANBECK, JR.

*Attesting Officer*     *Commissioner of Patents and Trademarks*